US012444867B2

(12) United States Patent
Büttemeyer et al.

(10) Patent No.: US 12,444,867 B2
(45) Date of Patent: Oct. 14, 2025

(54) PRINTED CIRCUIT BOARD CONNECTOR HAVING HERMAPHRODITIC CONTACT ELEMENTS

(71) Applicant: HARTING Electric Stiftung & Co. KG, Espelkamp (DE)

(72) Inventors: Jana Büttemeyer, Rahden (DE); Gert Havermann, Wallenhorst (DE); Marc Genau, Lübbecke (DE); Arno Westpfahl, Espelkamp (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 277 days.

(21) Appl. No.: 18/038,051

(22) PCT Filed: Nov. 29, 2021

(86) PCT No.: PCT/DE2021/100946
§ 371 (c)(1),
(2) Date: May 22, 2023

(87) PCT Pub. No.: WO2022/127980
PCT Pub. Date: Jun. 23, 2022

(65) Prior Publication Data

US 2023/0411879 A1 Dec. 21, 2023

(30) Foreign Application Priority Data

Dec. 14, 2020 (DE) ..................... 10 2020 133 325.0

(51) Int. Cl.
*H01R 12/71* (2011.01)
*H01R 12/70* (2011.01)
(Continued)

(52) U.S. Cl.
CPC ....... *H01R 12/716* (2013.01); *H01R 12/7082* (2013.01); *H01R 12/721* (2013.01);
(Continued)

(58) Field of Classification Search
CPC ......................... H01R 12/716; H01R 12/7082; H01R 12/721; H01R 12/732; H01R 13/6597; H01R 24/84
(Continued)

(56) References Cited

U.S. PATENT DOCUMENTS 4,904,212 A * 2/1990 Durbin ................. H01R 43/205 439/82
5,161,985 A * 11/1992 Ramsey ................. H01R 24/84 439/74

(Continued)

FOREIGN PATENT DOCUMENTS

DE 102007038221 10/2008
EP 1396051 A2 3/2004

(Continued)

*Primary Examiner* — Tulsidas C Patel
(74) *Attorney, Agent, or Firm* — Smartpat PLC

(57) ABSTRACT

A printed circuit board connector for connecting at least one circuit board to at least one additional circuit board or at least one corresponding circuit board connector, comprises a housing, at least two contact elements which are arranged in pairs and have at least two narrow sides and at least two wide sides, the contact elements having at least one flexible contact region, at least the flexible contact region of the contact elements being substantially identically shaped, the housing being designed to orient the contact elements substantially perpendicularly to the receiving circuit board, each contact having a rigid contact region that adjoins the flexible contact region, the rigid contact region having at least one fastening element for fastening the contact element in the housing.

15 Claims, 3 Drawing Sheets

(51) Int. Cl.

| | |
|---|---|
| ***H01R 12/72*** | (2011.01) |
| ***H01R 12/73*** | (2011.01) |
| ***H01R 13/6597*** | (2011.01) |
| ***H01R 24/84*** | (2011.01) |

(52) U.S. Cl.
CPC ....... *H01R 12/732* (2013.01); *H01R 13/6597* (2013.01); *H01R 24/84* (2013.01)

(58) Field of Classification Search
USPC ........................................................ 439/65, 74
See application file for complete search history.

(56) References Cited

U.S. PATENT DOCUMENTS

| | | | | |
|---|---|---|---|---|
| 5,181,855 | A * | 1/1993 | Mosquera | H01R 12/7005 439/291 |
| 5,593,311 | A * | 1/1997 | Lybrand | H01R 24/62 439/607.11 |
| 5,921,787 | A * | 7/1999 | Pope | H01R 12/85 439/74 |
| 6,702,590 | B2 | 3/2004 | Zaderej et al. | |
| 10,122,134 | B2 | 11/2018 | Shibuya | |
| 2007/0010108 | A1 | 1/2007 | Soh et al. | |
| 2009/0047816 | A1 | 2/2009 | Lappoehn | |
| 2009/0081903 | A1* | 3/2009 | Zhang | H01R 13/28 439/626 |
| 2010/0297893 | A1 | 11/2010 | Masuda et al. | |
| 2018/0019555 | A1 | 1/2018 | Shibuya | |
| 2024/0014590 | A1* | 1/2024 | Büttemeyer | H01R 12/724 |

FOREIGN PATENT DOCUMENTS

| | | | |
|---|---|---|---|
| EP | 1148587 | B1 | 4/2005 |
| JP | H0472471 | U | 6/1992 |
| JP | 2001307846 | A | 11/2001 |
| KR | 20130021418 | A | 3/2013 |
| WO | 2019201768 | A1 | 10/2019 |
| WO | 2022127979 | A1 | 6/2022 |

* cited by examiner

PRINTED CIRCUIT BOARD CONNECTOR HAVING HERMAPHRODITIC CONTACT ELEMENTS

CROSS-REFERENCE TO RELATED APPLICATION

This application is a national stage application, filed under 35 U.S.C. § 371, of International Patent Application No. PCT/DE2021/100946, filed on 29 Nov. 2021, which claims the benefit of German Patent Application No. 10 2020 133 325.0, filed 14 Dec. 2020.

BACKGROUND

Printed circuit board connectors are required, for example, in order to transmit electrical currents, voltages, and the signals and data thereby produced, from a printed circuit board to a cable or an adjacent printed circuit board. Straight printed circuit board connectors are normally used in order to connect printed circuit boards, which are arranged in planes running parallel to one another, to one another. These printed circuit board connectors are required in particular for connecting daughter boards or so-called mezzanine printed circuit board arrangements. In this case, the printed circuit board connectors allow printed circuit boards to be connected along a plane running orthogonally to the plane of the printed circuit board. As a result, printed circuit boards are thus arranged vertically to one another in planes running parallel to one another.

Hermaphroditic connectors and contact elements are substantially characterized in that they can be plugged into a mating connector/contact element of the same kind.

Printed circuit board connectors with hermaphroditic contact elements are known in the prior art.

WO 2019/201768 discloses a connector part comprising a plurality of hermaphroditic contact elements for making contact with associated hermaphroditic contact elements of a mating connector part, wherein each hermaphroditic contact element has a body, a first contact lug extending from the body in a first direction, and a second contact lug extending from the body in a first direction, wherein the first contact lug and the second contact lug are offset in respect of one another in a second direction extending transversely to the first direction, and also in a third direction extending transversely to the first direction and transversely to the second direction.

DE 10 2007 038 221 B3 discloses an electrical connector with hermaphroditic contact elements having the features: the electrical contact element of a first connector is open in the shape of a fork towards a second electrical contact element, the inner surfaces of the forks having two legs in each case enclosing, at least in part, one leg of the associated other contact element in each case, wherein one of the two legs has a convexly projecting shape, the other of the two legs having a concave recess, and wherein the shape of the concave recess is adapted to the convexly projecting form in such a manner that when two connectors are in the connected state, the convexly projecting form of the first connector rests against the concave recess of the second connector in an at least partially form-fitting manner, and vice versa.

One disadvantage of the prior art is the frequently complex, intricate, and therefore expensive, contact elements. Rough structures are often proposed as an alternative, in order to ensure that a secure contact is made by the contact elements. Thin wire contact elements are frequently used in the field of electronic data transmission. This means that the contact elements are often formed from a (thin) wire, for example by a bending process. The making of a secure and defined contact is not always guaranteed in this case.

SUMMARY

An object of the disclosure is to provide a compact printed circuit board connector with hermaphroditic contact elements, the contact elements of which are easy to manufacture and ensure that a secure and defined contact is made.

The object is achieved by the subject matter of the independent claim(s).

Advantageous embodiments of the invention are specified in the dependent claims and the following description.

In order to achieve the object, an embodiment of a printed circuit board connector for connecting at least one printed circuit board to at least one other printed circuit board, or at least one corresponding printed circuit board connector, is proposed, which has a housing, at least two contact elements arranged in pairs, which are formed with at least two narrow sides and at least two wide sides. The contact elements have at least one flexible contact region, wherein at least the flexible contact region of the contact elements is shaped in substantially the same way, and wherein the housing is designed to align the contact elements substantially orthogonally to the connected printed circuit board. Each contact in this case has a rigid contact region following the flexible contact region, wherein the rigid contact region has at least one fixing element for fixing the contact element in the housing. The printed circuit board connector optionally has at least one shielding element. The housing optionally has at least one connecting element. Contact elements which are produced from an electrically conductive material and from a plate, a metal sheet, a coil (also referred to as a collar), or comparable transport units, are therefore substantially proposed as contact elements. The narrow side is to be understood, in particular, to be the side of a contact element which substantially occupies a width which takes from the material thickness of the transport unit of the material from which a contact element is formed. Correspondingly, a wide side of a contact element is to be understood as a side formed from the plane of a transport unit. Shielding unit refers to an electrically conductive component which has a positive effect on the electromagnetic compatibility (EMC) of the printed circuit board connector, the contact elements thereof, and possibly also its direct environment. This means that electronic data is less affected by electromagnetic interference. For example, projections, pins or spigots on the housing of the printed circuit board connector are to be understood as connecting elements which are designed to fix the printed circuit board connector to a printed circuit board in at least one direction. Alternatively, a connecting element can be used for simplified positioning of the printed circuit board connector. In a clever way, a connecting element can be used for protection against incorrect connection, according to the poka yoke principle. Ideally, forces also occurring during a plugging action are diverted and/or distributed in a positive manner by the connecting element. The flexible contact region can be taken to mean a region of the contact element that can be elastically deformed in a desired manner along a narrow side, in order to facilitate and/or enable a contact to be made with an identical contact element along the narrow side. A rigid contact region should therefore be understood to mean a region of the contact element which cannot be deformed, or can only be deformed to a limited extent, along a narrow side. As a result, the rigid region is particularly well suited to an attachment in the housing of the printed circuit board connector. The end region of the rigid region which is opposite the flexible region is furthermore suitable for soldering to a soldering region of the associated printed circuit board, in the form of a soldering pad, for example. A hermaphroditic contact element is to be understood to mean, in particular, a substantially identically formed flexible contact region of the contact elements. Blade contacts and/or pin contacts which are known in the art are not flexible, or not sufficiently flexible, among other things on account of the intended use.

In a clever embodiment of a printed circuit board connector according to the invention, the contact elements are arranged in pairs along a plug-in side of the housing, so that at least two positions along the plug-in side are each provided with at least two contacts. The plug-in side of the housing should be understood to mean the side of the housing which is designed for connection to a corresponding cable connector or a printed circuit board connector. In other words, the plug-in side of a housing is formed by a plane which is oriented substantially parallel to the printed circuit board. In this plane, the contact elements are arranged in pairs on at least two straight lines running orthogonally to the printed circuit board and parallel to one another, which straight lines are spaced apart from one another.

In a preferred embodiment, one of the narrow sides of the contact elements is formed with at least one contact tip and one contact surface in each case. This means that the contact tip and the contact surface are arranged on the same narrow side. In this case, both the contact tip and the contact surface are preferably assigned to a flexible region of the contact element. Alternatively, it is possible for the contact surface to be configured on a rigid region. The rigid region of the contact element in this case is substantially characterized by a width that is greater than, or equal to, the average width of the wide side. The flexible region is characterized by a width of the wide side that is smaller than the average width of the wide side.

In one embodiment, the molded contact tips and contact surfaces of the contact elements arranged in pairs are oriented in opposite directions to one another. What this means is that an upper contact element is oriented in such a manner that the contact tip and the contact surface point upwards, while the contact tip and the contact surface of a lower contact element point downwards, and vice versa.

One embodiment provides that the housing is formed with contact receptacles which have a recess towards the plug-in side of the housing to receive the flexible contact region. A through-opening in the housing, which at least allows the flexible region of the contact element to project beyond the housing, is to be understood to be the contact receptacle. In a clever way, the contact receptacle is realized as part of the housing which projects from the main body of the housing. In this case, the recess in the contact receptacle of the housing is designed to embed the flexible region of the contact element at least in part. Ideally, the contact receptacle encloses the contact element through the recess in a roughly u-shape or c-shape. This means that the movement of the contact element, or the flexible region of the contact element, is restricted at least in the lateral direction. This movement restriction ensures that the contact element makes contact with a contact element of a mating connector of the printed circuit board connector. At the same time, the accidental making of contact between two contact elements of the printed circuit board connector positioned next to one another is reliably prevented.

In a clever embodiment, the contact elements are spaced at a distance of less than 0.8 mm along the wide side of the housing. What this means is that the contact elements are brought into engagement on a printed circuit board with a grid of 0.8 mm and less. This means that the soldering regions at the end of a rigid region of a contact element, in particular, can be oriented to match current, minimalized printed circuit board connectors. In other words, the printed circuit board connector can be configured in such a manner that printed circuit boards with a grid spacing of 0.8 mm and less can be equipped with a printed circuit board connector according to the invention.

In one embodiment, the recess in the contact receptacle allows the contact tip to make contact with the contact surface of a flexible contact region which is substantially identical. What this means is that the recess of the contact receptacle has a depth which allows the flexible contact region sufficient space to facilitate elastic deformation during a plug-in action. Due to the elastic deformation of the flexible contact region during a plug-in action, the contact tip of a contact element of the printed circuit board connector can be pushed over the contact tip of a contact element of a mating connector, in order to reach the corresponding contact surface in each case and make contact therewith with a definable spring force. In order to prevent the flexible contact region from deflecting along the wide side of the plug connector during a plug-in action, it is proposed that the recess should be configured with a width that substantially corresponds to the width of the narrow side of the contact element. A maximum width of the recess which corresponds to approximately one-and-a-half times the width of the narrow side of the contact element is reasonable. In the case of contact elements with a width of the narrow side which is less than, or equal to, 0.25 mm, it is proposed that the recess of the contact receptacle should be configured with a width that is less than, or equal to, 0.35 mm.

In a clever embodiment, the contact receptacle encloses the contact elements in a substantially u-shape through the recess, so that at least some of the contact tips project from the contact receptacle, at least in the unplugged state. In this way, the flexible contact region of a contact element is, in particular, prevented from deflecting in the direction of the wide side of the housing. In other words, the u-shaped recess allows an elastic deformation of the flexible region of the contact element only in the directions provided for this.

In one embodiment, the contact receptacle encloses the contact elements substantially in a u-shape through the recess, so that at least some of the contact surfaces project from the contact receptacle, at least in the unplugged state. What this means is that the contact surface of a contact element is at least partially enclosed by the u-shape of the recess, but not covered by it. Insofar as the movement of the contact tip is restricted by the recess, at least in the longitudinal direction of the wide side of the housing, the contact surface may project at least in part from the u-shaped recess, without jeopardizing the making of a secure contact between the contact tip and the contact surface.

An alternative embodiment provides a hermaphroditic printed circuit board connector, whereof the housing is configured with at least three contact receptacles, wherein the contact receptacles receive at least two contact elements and at least four contact elements alternately.

In a preferred embodiment, two contact receptacles, each having two contact elements, are arranged following on a single contact receptacle having four contact elements, or vice versa, wherein the contact receptacles are each arranged with two contact elements on opposite edges along a wide side of the housing. This means, for example, that two contact receptacles are arranged on the edges of the connector and each receive two contact elements next to one another along a wide side of the housing. A contact receptacle which receives four contact elements is arranged following along the wide side of the housing. In this case, two contact elements are arranged one below the other, and one further contact element each to the side. In this case, contact elements are arranged along the same position in relation to the length of the wide side, in such a manner that the contact tip and the contact surface of the contact elements point in opposite directions. The contact receptacles can therefore be divided into three regions. An upper contact receptacle positioned on an upper edge of a wide side of the housing is configured to receive at least two contact elements. A central contact receptacle arranged centrally along the same wide side of the housing designed to receive at least four contact elements. And a lower contact receptacle which is arranged on a lower edge of the wide side of the housing and is designed to receive at least two contact elements. In this case, the contact tip and the contact surface of the contact elements, which are received by the upper contact receptacle, preferably point in the direction of the lower edge of the wide side of the housing. The contact tip and the contact surface of the contact elements which are arranged in the lower contact receptacle therefore point in the direction of the upper edge of the wide side of the housing. Two upper contact elements which are arranged in the central contact receptacle preferably point in the direction of the upper edge of the wide side of the housing. It follows from this that the contact elements arranged at the bottom in the central contact receptacle, or the contact tip and the contact surface of these contact elements, point in the direction of the lower edge of the wide side of the housing.

In one embodiment, a narrow side of the housing has a wall which extends over the length of the housing and the length of at least one contact receptacle. On the one hand, the embodiment with a wall puts in place protection against incorrect connection according to the poka yoke principle. In addition, the wall can be provided with a shielding element, in order to protect the contacts from electromagnetic interference. Due to the hermaphroditic design of the printed circuit board connector according to the invention, a so-called 360 degree shielding can be achieved by means of a shielded side wall when the printed circuit board connector is in the plugged-in state.

In a further alternative embodiment, a female printed circuit board connector is designed with a housing having at least two contact receptacles for receiving at least two contact elements in each case, wherein the contact receptacles are arranged on opposite edges along a wide side of the housing.

In a further alternative embodiment, a male printed circuit board connector is configured with a housing, at least one contact receptacle for receiving at least four contact elements in each case, wherein the contact receptacle is arranged substantially centrally along a wide side of the housing.

BRIEF DESCRIPTION OF THE DRAWINGS

An exemplary embodiment of the invention is shown in the drawings and is explained in greater detail below.

DETAILED DESCRIPTION

The figures contain partially simplified, schematic representations. In some cases, identical reference signs are used for the same, but possibly not identical elements. Different views of the same elements could be scaled differently.

Directions such as "left", "right", "up" and "down" are to be understood with reference to the respective figure and may vary in the individual representations by comparison with the depicted object.

Figure 1:
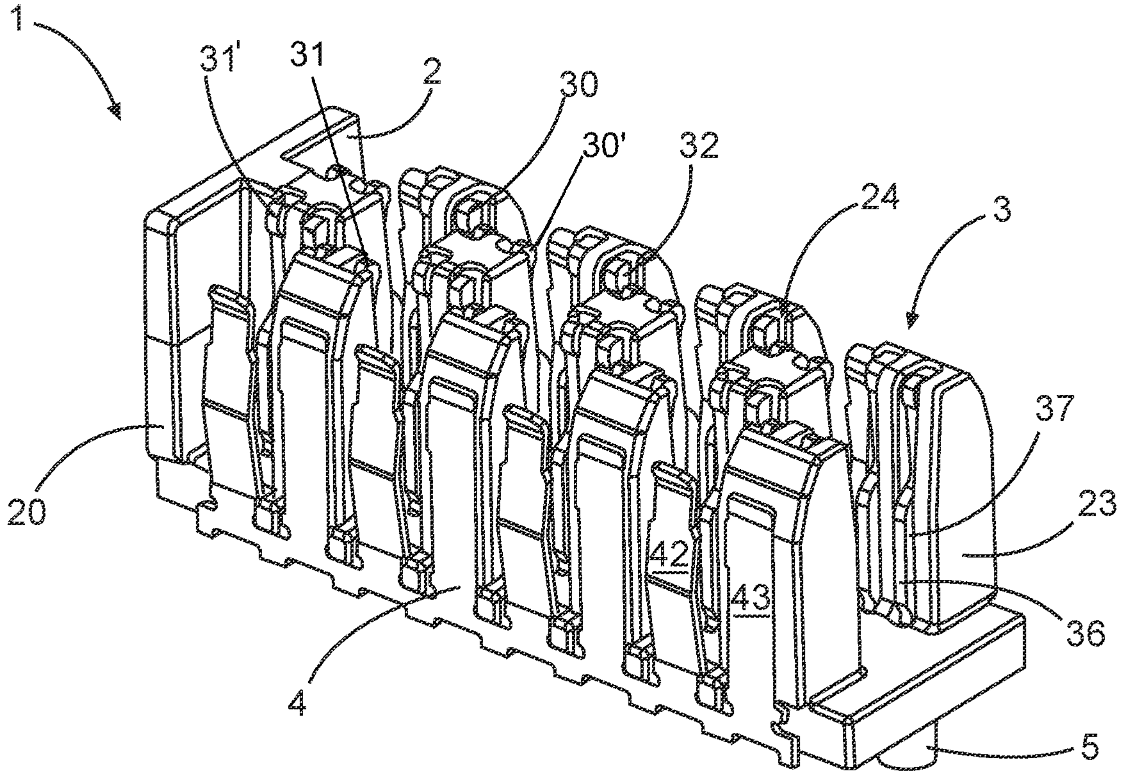
FIG. 1 shows a perspective view of a hermaphroditic printed circuit board connector.
Figure 2:
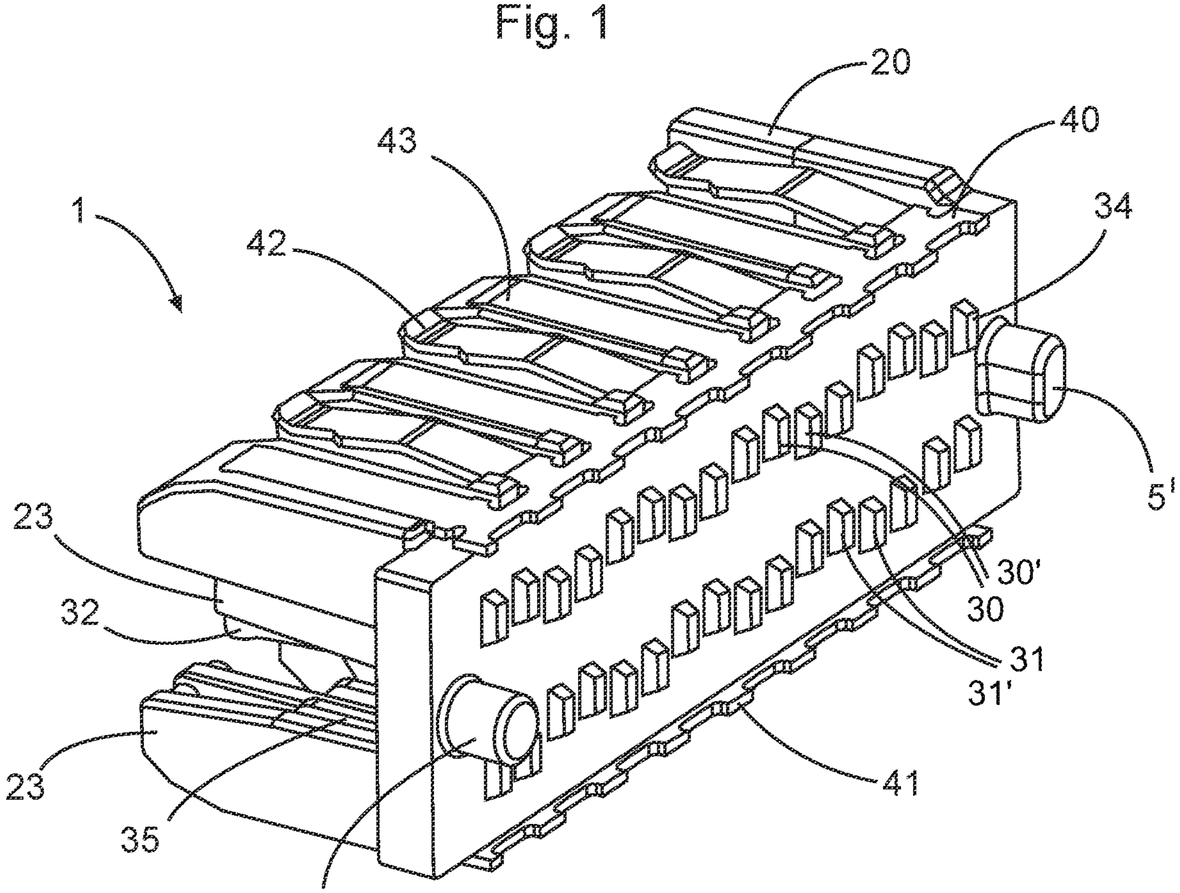
FIG. 2 shows a perspective view of a hermaphroditic printed circuit board connector from below.

FIG. 1 and FIG. 2 show different perspective views of a hermaphroditic printed circuit board connector 1 according to the invention with hermaphroditic contact elements 3, according to claim 1. The housing 2 that can be seen in this case, configured as a hermaphroditic housing 20, includes a plurality of contact elements 3. The contact elements 3 have a substantially identical design. The contact elements 3 each have a contact tip 32 and a contact surface 35. These are formed along a narrow side 37 of the contact elements 3. A fixing element provides for the anchoring of the contact elements 3 in the housing 2. At the same time, the fixing element in the housing 2 serves as are understood to be a border region for distinguishing between the flexible contact region 33 and the rigid contact regions 34. The housing 2 is at least partially enclosed by shielding elements 4 and 4'. The housing 2 furthermore has at least one connecting element 5 which is used for connecting to a printed circuit board. In order to allow secure positioning of the printed circuit board connector 1 with respect to a printed circuit board according to the poka yoke principle, it is proposed that at least two connecting elements 5 and 5' should be added, wherein the connecting elements 5 and 5' differ in their shape. Both differences in geometric form and differences in sizing are helpful and useful in this case. The housing 2 also has at least one contact receptacle 23. This contact receptacle 23 cleverly has at least one recess 24 for each contact element 3.

FIG. 2 shows a hermaphroditic printed circuit board connector 1 as an isometric view from below. The structure of the printed circuit board connector 1 becomes clear in this case. The hermaphroditic housing 20 begins below an upper screen element 40. The hermaphroditic housing 20 has a plurality of contact receptacles 23 which receive two contact elements 3 and four contact elements 3 alternately. In this case, two contact receptacles 23 for receiving two contact elements 3 in each case are arranged on the edges of the hermaphroditic housing 20. The contact receptacle 23 for receiving four contact elements 3 is assigned substantially centrally to this side of the hermaphroditic housing 20, which is referred to as the connector face. Each contact receptacle 23 provides a recess 24 for each contact element 3 received. It can be clearly seen in this case that the flexible contact region 33 is at least partially enclosed by the recess 24, substantially in a u-shape. A web formed by two u-shaped recesses 24 prevents accidental contact from being made between two adjacently arranged contact elements 3. Likewise, it becomes clear that the contact tip 32 of each contact element 3 is received substantially within this u-shaped recess 24. Furthermore, it can be seen that the contact surfaces 35 project slightly from precisely these u-shaped recesses 24, so that when the printed circuit board connector 1 is connected to a printed circuit board connector 1 of the same design, the contact tips 32 can establish a secure contact on the contact surface 35. The hermaphroditic housing 20 has a side wall formed thereon. This is formed to prevent the hermaphroditic printed circuit board connectors 1 from being wrongly connected. It is furthermore shown that the upper contact elements 30 and 30' are oriented in opposite directions. Likewise, the lower contact elements 31 and 31' point in opposite directions. The configuration of the printed circuit board connector 1 thereby means that only one design of the contact elements 3 having identical flexible contact regions 33 and identical rigid contact regions 34 is required. Finally, FIG. 2 shows a lower shielding element 41 in the lower region of the hermaphroditic housing 20, as well as two connecting elements 5 and 5'. The shielding elements 4, that is to say both the upper shielding element 40 and the lower shielding element 41, have shielding contact elements 42 and shielding contact surfaces 43 formed alternately thereon.

Figure 3:
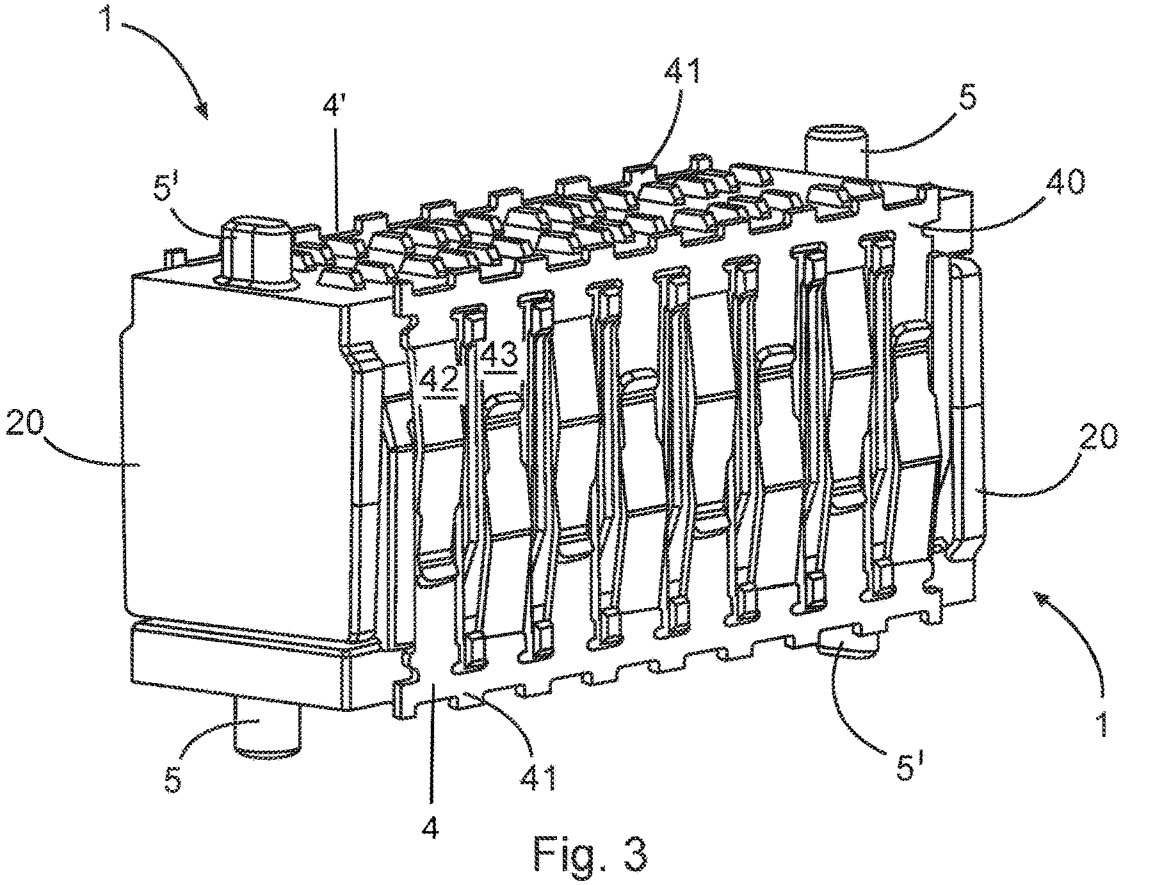
FIG. 3 shows a perspective view of a hermaphroditic printed circuit board connector in the plugged-in state with an identical printed circuit board connector.

FIG. 3 shows two identical printed circuit board connectors 1 with a hermaphroditic housing 20 in the plugged-in state. The printed circuit board connectors 1 are each connectable to a printed circuit board and soldering regions located thereon. The connecting elements 5 and 5' can be inserted in corresponding through-openings in the printed circuit board. The shielding elements 4 make mutual contact with the shielding contact elements 42 and shielding contact surfaces 43 illustrated in FIG. 2. In this case, the shielding contact elements 42 are brought into an elastically deformable position and have a ridge shape pointing outwards. This ridge shape makes it easier for there to be a secure plugging process between two printed circuit board connectors 1 and the corresponding shielding elements 4.

Figure 4:
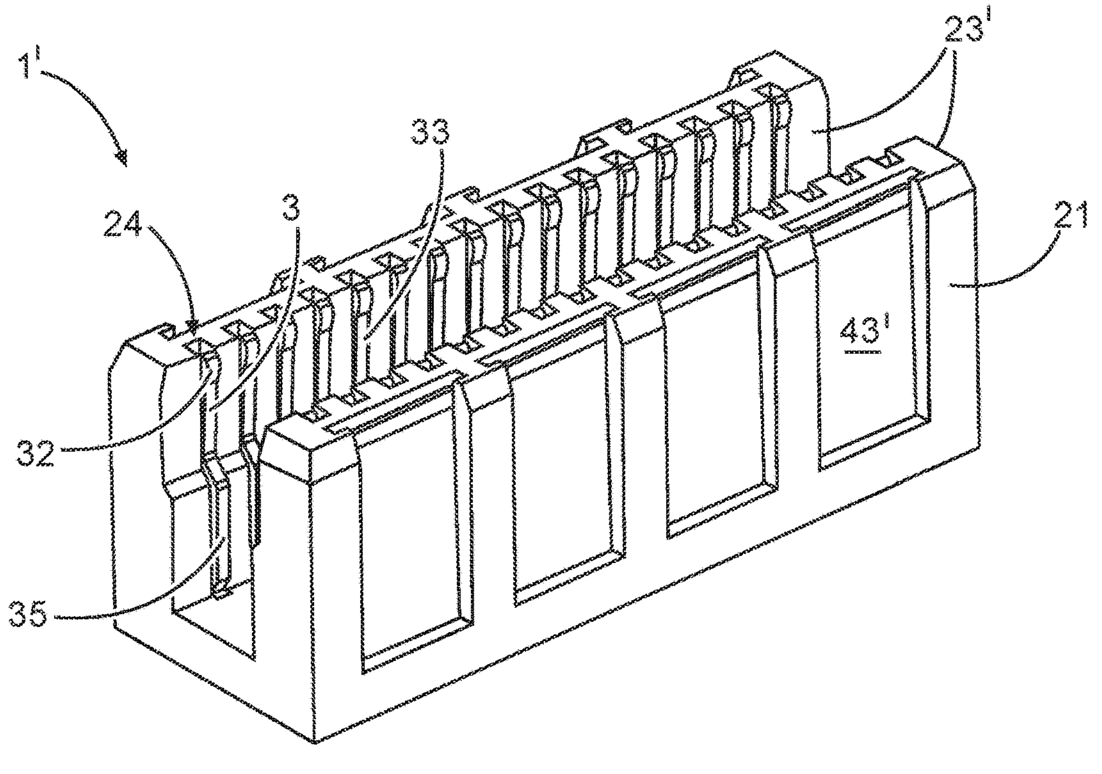
FIG. 4 shows a perspective view of a female printed circuit board connector.

FIG. 4 shows an alternative embodiment of a printed circuit board connector 1 according to the invention. This is an embodiment with a so-called female housing 21. The contact elements 3 in this case are housed in two contact receptacles 23' which are each arranged on the edges of the female housing 21 on the plug-in side. The contact receptacle 23' accommodates the upper contact elements 30 with the contact tip 32 and contact surface 35 pointing downwards, and the lower contact elements 31' with the contact tip 32 and contact surface 35 pointing upwards. The shielding elements are located above the upper contact elements 30 and below the lower contact elements 31. In this case, the shielding elements in this embodiment are designed exclusively with shielding contact surfaces 43'.

Figure 5:
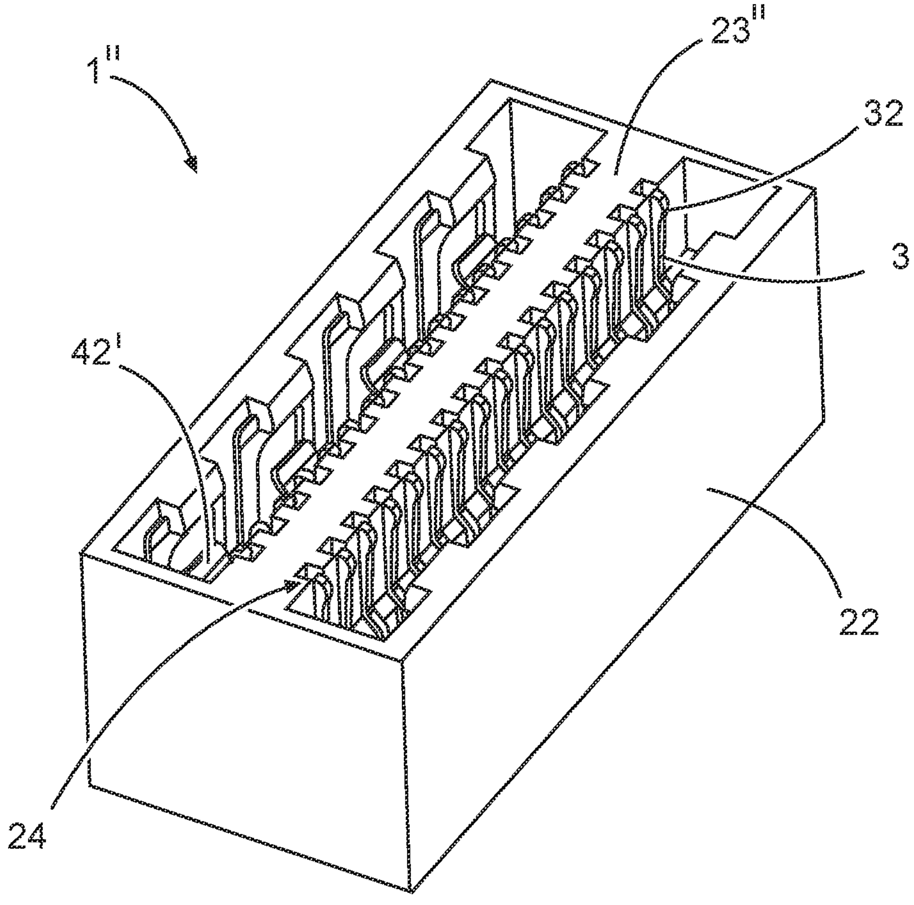
FIG. 5 shows a perspective view of a male printed circuit board connector.

FIG. 5 shows an embodiment of a printed circuit board connector 1" with a male housing 22 that corresponds to the printed circuit board connector 1' with a female housing 21. The male housing 22 has only one centrally arranged contact receptacle 23". The contact receptacle 23" receives the upper contact elements 30' with the contact tip 32 and contact surface 35 pointing upwards, and the lower contact elements 31 with the contact tip 32 and contact surface 35 pointing downwards. The shielding elements are designed exclusively with shielding contact elements 42' which are configured to be elastically deformable. The shielding contact elements make an electrical contact with the shielding contact surfaces 43' of a printed circuit board connector 1' with a female housing 21.

Even if different aspects or features of the invention are shown in combination in the figures, it is obvious to the person skilled in the art—unless otherwise stated—that the combinations shown and discussed are not the only possible ones. In particular, mutually corresponding units or groups of features from different exemplary embodiments can be exchanged for one another.

LIST OF REFERENCE SIGNS

1 printed circuit board connector
2 housing
3 contact element
4 shielding element
5 connecting element
20 hermaphroditic housing
21 female housing
22 male housing
23 contact receptacle
24 recess
30 upper contact element
31 lower contact element
32 contact tip
33 flexible contact region
34 rigid contact region
35 contact surface
36 narrow side
37 wide side
40 upper shielding element
41 lower shielding element
42 shielding contact element
43 shielding contact surface

The invention claimed is:

1. A hermaphroditic printed circuit board connector for connecting a printed circuit board to a further printed circuit board, comprising:

a housing, including
  a rectangular base, and
  contact receptacles extending upwardly from the rectangular base, including
    first outer contact receptacles extending from a first wide side of the rectangular base, the first outer contact receptacles being separated by gaps,
    second outer contact receptacles aligned opposite the first outer contact receptacles and extending from a second wide side of the rectangular base opposite the first wide side, and
    center contact receptacles arranged along a center axis of the rectangular base between the first wide side and the second wide side, the center contact receptacles being longitudinally aligned with the gaps between the first outer contact receptacles; and
contact elements, each formed with narrow sides and wide sides having a contact surface for contacting a mating contact element formed in one of the narrow sides,
wherein each of the first outer contact receptacles and each of the second outer contact receptacles includes two of the contact elements facing inwardly,
wherein each of the center contact receptacles includes four of the contact elements facing outwardly, two facing towards the first wide side and two facing towards the second wide side,
wherein the contact elements each have a flexible contact region,
wherein the flexible contact regions of the contact elements are shaped in substantially the same way, wherein the housing is designed to align the contact elements substantially orthogonally to the printed circuit board, wherein each contact element has a rigid contact region following the flexible contact region, and wherein the rigid contact region extends through the rectangular base and fixes the contact element in the housing.

2. The hermaphroditic printed circuit board connector as claimed in claim 1, wherein the contact elements have an at least substantially identical design.

3. The hermaphroditic printed circuit board connector as claimed in claim 1, wherein the one of the narrow sides of each contact element is formed with a contact tip above the contact surface.

4. The hermaphroditic printed circuit board connector as claimed in claim 3, wherein the contact receptacles have a recess for receiving the flexible contact region of each of the contact elements.

5. The hermaphroditic printed circuit board connector as claimed in claim 1, wherein the contact elements are spaced at a distance of less than 0.8 mm along a longitudinal axis of the housing.

6. The hermaphroditic printed circuit board connector as claimed in claim 4, wherein the contact tip extends out of the recess for contacting a further contact surface of a mating contact element.

7. The hermaphroditic printed circuit board connector as claimed in claim 4, wherein the recess is configured to receive a contact element with a width that is less than, or equal to, 0.35 mm.

8. The hermaphroditic printed circuit board connector as claimed in claim 4, wherein each contact receptacle encloses the contact elements in a substantially u-shape within the recess, and wherein at least part of the contact tips project from the contact receptacle, at least in an unplugged state.

9. The hermaphroditic printed circuit board connector as claimed in claim 4, wherein the contact receptacle encloses the contact elements substantially in a u-shape within the recess, and wherein at least part of the contact surfaces project from the contact receptacle, at least in an unplugged state.

10. The hermaphroditic printed circuit board connector as claimed in claim 1, wherein the housing is configured with at least three center contact receptacles.

11. The hermaphroditic printed circuit board connector as claimed in claim 1, wherein the housing further includes a wall extending upwardly from a narrow side of the rectangular base.

12. The hermaphroditic printed circuit board connector as claimed in claim 11, wherein the wall has a T-shaped profile, with a flange of the T-shaped profile extending along the a narrow side of the rectangular base and a web of the T-shaped profile extending to a first of the center contact receptacles.

13. The hermaphroditic printed circuit board connector as claimed in claim 11, further comprising a shielding element held at the first wide side of the rectangular base, the shielding element including shielding contact surfaces extending upwardly adjacent to the first outer contact receptacles, and shielding contact elements extending upwardly adjacent to the gaps, wherein the shielding contact elements have an outwardly bent tip and are configured to contact shielding contact surfaces of a mating hermaphroditic printed circuit board connector.

14. The hermaphroditic printed circuit board connector as claimed in claim 13, wherein the shielding element extends downwardly below the rectangular base.

15. The hermaphroditic printed circuit board connector as claimed in claim 13, further comprising a second shielding element held at the second wide side of the rectangular base, the second shielding element including second shielding contact surfaces extending upwardly adjacent to the second outer contact receptacles, and second shielding contact elements extending upwardly opposite the gaps.

* * * * *